UNITED STATES PATENT OFFICE.

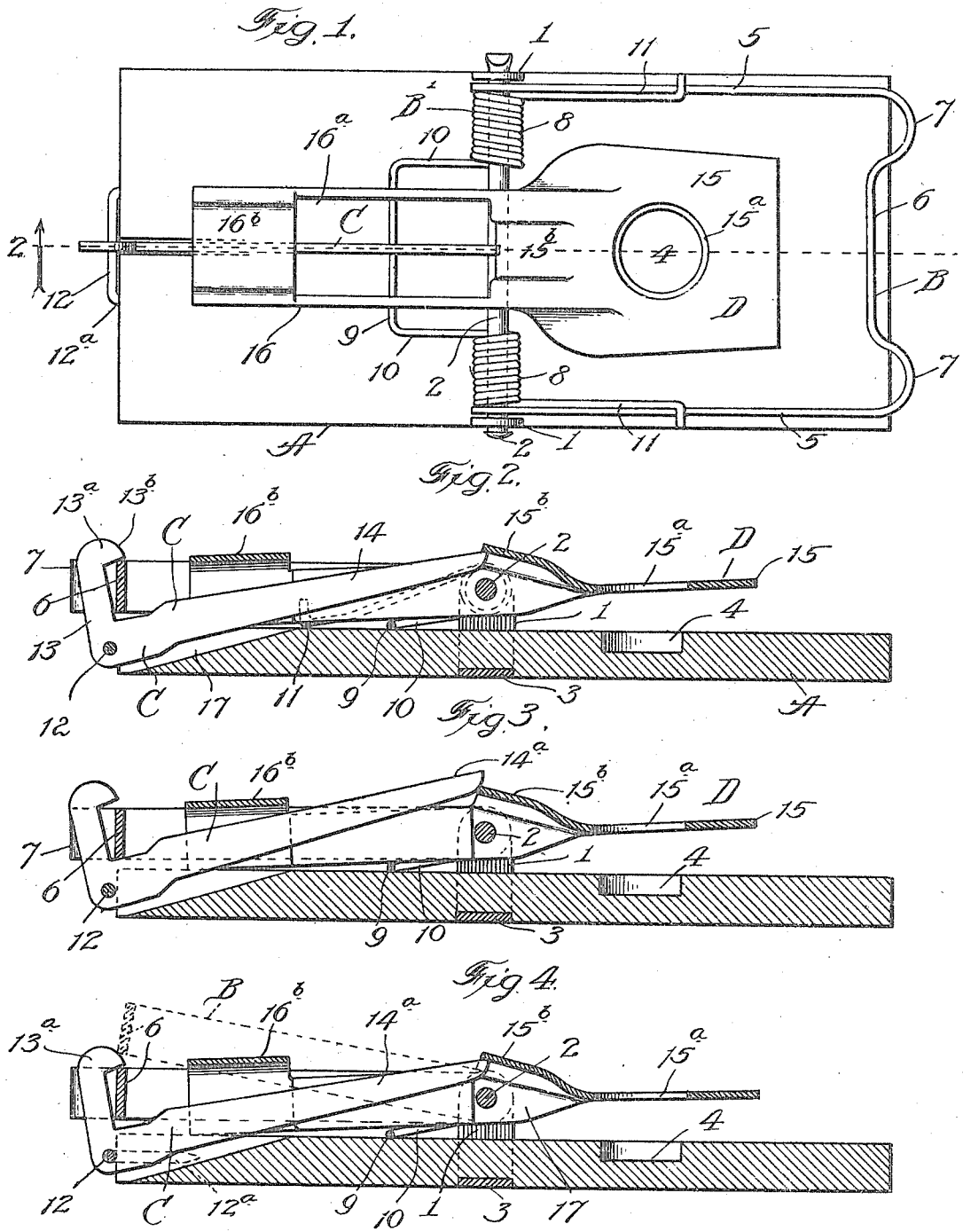

WILLIAM C. STILSON, OF MORRISON, ILLINOIS.

TRAP.

1,248,944.   Specification of Letters Patent.   Patented Dec. 4, 1917.

Application filed October 11, 1913. Serial No. 794,563.

*To all whom it may concern:*

Be it known that I, WILLIAM C. STILSON, a citizen of the United States, residing at Morrison, in the county of Whiteside and State of Illinois, have invented a new and useful Improvement in Traps, of which the following is a specification.

This invention relates particularly to mouse-traps, rat-traps, etc.; and the primary object of the invention is to provide a trap which can be readily set in a secure manner, which is capable, nevertheless, of being easily sprung, which is durable, and which can be manufactured at such a low cost as to enable it to be sold with profit at a popular price.

The invention is illustrated, in its preferred embodiment, in the accompanying drawing, in which—

Figure 1 represents a plan view of my improved trap in the "sprung" condition; Fig. 2, a vertical sectional view, taken as indicated at line 2 of Fig. 1, but showing the trap in the "set" condition; Fig. 3, a sectional view, similar to Fig. 2, showing a slight modification and showing the trap in one condition which it assumes while being set; and Fig. 4, a view similar to Fig. 3, but showing the modified form of trap in set condition, the dotted lines indicating the position of the striker at one point in the operation of setting the trap.

Referring to Figs. 1 to 2 inclusive, the trap, as there shown, comprises a base-plate or frame A; a striker B equipped with a spring B'; a latch-lever C; and a trip-member D.

The base-plate or frame A comprises a comparatively thin rectangular block of wood, equipped centrally of its length with standards 1 which support a pivot 2. The standards or ears 1 may comprise the upturned ends of a light metal bar which has its web or cross-portion 3 received in a transverse groove with which the plate A is provided on its lower surface. The forward part of the plate or board A is provided in its upper surface with a recess 4 adapted to receive bait.

The striker B, preferably comprises a metal bar of general U-form having arms 5 pivoted at their extremities on a pivot 2 and a web or cross-member 6. The cross-member 6 of the striker is adapted to rest on the front portion of the base A when the trap is in the "sprung" condition, as shown in Fig. 1. The member 6 is curved outwardly at points 7 at the junctions with the arms 5, to afford finger-pieces adapted for use in setting the striker. The curved portions 7 also contribute to the resilience of the striker, enabling it to be sprung past the latch-arm of the latch-lever, in the setting operation, in case of necessity.

In the form shown, the spring B' comprises coils 8 supported on the pivot 2; a web 9 formed integrally with arms 10 extending rearwardly from the inner ends of the coils 8, the web 9 resting on the base A; and arms 11 engaging the arms 5 of the striker, it being understood that the spring B' is normally under some tension in the position shown in Fig. 1, and that the tension is increased when the striker is moved to the position shown in Fig. 2. The latch-lever C is supported on a pivot 12 adjacent the rear edge of the base-plate A. The pivot 12 may constitute the web of a staple which has arms or brads 12$^a$ extending into the rear edge-portion of the base-plate. The latch-lever preferably comprises a metal bar of angular form, and having an upturned latch-engaging short arm 13, and a forwardly extending long arm 14 which projects to a point above the pivot 2. The arm 13 has a forwardly projecting nose-portion 13$^a$ adapted to engage the cross-member 6 of the striker. The nose-portion 13$^a$ is rounded on its upper side, as indicated at 13$^b$.

The trip-member D is preferably formed of sheet metal, and preferably comprises a front arm 15 and a rear arm 16. The front arm 15 is preferably made comparatively wide to afford a tread-portion, and is provided with an opening 15$^a$ adapted to register with the recess 4. The lateral edge-portions of the rear part of the member D are turned downwardly to afford flanges 17, which are provided at their front portions with perforations through which the pivot 2 extends. The arm 16 of the member D is shown cut away in the rear of the pivot 2, as indicated at 16$^a$. At the rear end of arm 16 is left the yoke or cross-piece 16$^b$, which is disposed above the long arm 14 of the latch-lever C. The rear arm 16 of the trip-member D is preferably of sufficient weight to slightly overbalance the front arm 15, so that the trip-member will automatically assume the locking position when the striker is moved to the set position. The rear portion of the arm or tongue 15 is provided, in front of the opening 16ᵃ, with an upwardly struck embossment 15ᵇ, which is adapted to slightly overlie the front extremity of the arm 14 of the latch-lever, and thereby lock the latch-lever in the striker-holding position.

Where the pivot 12 is formed in the manner illustrated, the base-plate A is provided centrally at the rear portion of its upper surface with a recess 18 adapted to accommodate the elbow-portion of the latch-lever C.

To set the trap, it is only necessary to grasp the striker at the points 7 and swing the striker from the position shown in Fig. 1 to the position shown in Fig. 2, when the cross-member 6 of the striker will pass below the nose-portion 13ᵃ of the latch-member C, and the latch-member will automatically engage the striker. At the same time, the trip-member D, overbalancing to the rear, will automatically lock the latch-lever, as shown in Fig. 2. It will be noted that the upward pressure of the striker will tend to swing the arm 13 of the latch-lever rearwardly, and will tend to swing the arm 14 upwardly. This action is resisted by the trip-lever D whose rear arm 16 rests, in the illustration given, on the base-plate. The slightest downward pressure on the front end of the arm 15 of the trip-lever will suffice to rock the member D forwardly on the pivot 2, thereby releasing the latch-lever and thus unlocking the striker. Inasmuch as the arm 14 is relatively long as compared with the arm 13, and the member 15ᵇ of the trip-lever engages the extremity of the arm 14 at a point practically above the pivot 2, it will be understood that while the striker will be most securely held by the latch-lever, nevertheless the trip action can be effected by use of the slightest pressure. So delicate is the action, indeed, that a breath upon the arm 15 of the trip-lever is sufficient to effect release.

To provide for some inequality in the positioning of the pivot 12 in actual manufacture, it may be desirable to make the long arm of the latch-lever a trifle longer than is illustrated in Figs. 1 and 2. Such an expedient is employed in the construction shown in Figs. 3 and 4, where the construction is exactly like the construction heretofore described, except that the long arm of the latch-lever, designated 14ᵃ, is made of slightly greater length than in the construction heretofore described. The other parts are similar to the parts heretofore described and are correspondingly designated. Where the arm 14ᵃ is thus lengthened, it may be possible for the extremity of the arm to assume a position above the member 15ᵇ, as shown in Fig. 3, in which case the arm 14ᵃ will be moved downwardly to a position below the member 15ᵇ by pressing the striker downwardly somewhat below the position shown in Fig. 3, it being noted that the cross-member 6 of the striker will engage the arm 14ᵃ slightly in front of the pivot 12, so that the arm 14ᵃ will be depressed, in which operation the extremity of the arm 14ᵃ will tilt the trip-member D forwardly somewhat, allowing the extremity of the arm 14ᵃ to pass below the member 15ᵇ.

Again, the extremity of the arm 14ᵃ may assume a position below the member 15ᵇ, while the striker may engage the nose-piece 13ᵃ of the latch-lever, as shown by the dotted lines in Fig. 4. In such case, the cross-member 6 of the striker will yield or bend forwardly in passing the nose-piece when the striker is forced downwardly to the locking position shown in full lines.

A trap of the character described is of simple construction, capable of being easily set without danger to the user, is reliable and durable, and may be manufactured at very low cost. The latching-operation occurs automatically in the operation of forcing the striker to the "set" position.

The foregoing detailed description has been given for clearness of understanding only, and no undue limitation should be understood therefrom, but the appended claim should be construed as broadly as permissible, in view of the prior art.

What I regard as new and desire to secure by Letters Patent is:

A trap comprising a base-plate equipped above its central portion with a transverse pivot, a U-shaped striker having a central web-portion and arms extending therefrom, the extremities of its arms being connected with said pivot, a spring serving to actuate said striker, a latch-lever pivotally connected with the rear portion of the base-plate and having an upturned latch-arm adapted to engage the web-portion of the striker, and having a forwardly-extending trip-arm, and a trip-member supported on said pivot and having a forwardly-extending arm and having also a portion disposed above said pivot and spaced to accommodate the free extremity of the trip-arm of said latch-lever between it and said pivot.

WILLIAM C. STILSON.

In presence of:
A. T. SKELLEY,
L. E. WHISTLER.